United States Patent
Sano

(10) Patent No.: US 9,079,557 B2
(45) Date of Patent: Jul. 14, 2015

(54) AIRBAG

(71) Applicant: NIHON PLAST CO., LTD., Fujinomiya-Shi, Shizuoka (JP)

(72) Inventor: Osamu Sano, Fujinomiya (JP)

(73) Assignee: NIHON PLAST CO., LTD., Fujinomiya-shi (JP)

( * ) Notice: Subject to any disclaimer, the term of this patent is extended or adjusted under 35 U.S.C. 154(b) by 0 days.

(21) Appl. No.: 14/260,457

(22) Filed: Apr. 24, 2014

(65) Prior Publication Data

US 2014/0319807 A1    Oct. 30, 2014

(30) Foreign Application Priority Data

Apr. 25, 2013  (JP) ................................. 2013-093053

(51) Int. Cl.
| | | |
|---|---|---|
| B60R 21/20 | (2011.01) | |
| B60R 21/2165 | (2011.01) | |
| B60R 21/237 | (2006.01) | |

(52) U.S. Cl.
CPC ........... *B60R 21/2165* (2013.01); *B60R 21/237* (2013.01)

(58) Field of Classification Search
USPC ...................................... 280/728.3, 732, 731
See application file for complete search history.

(56) References Cited

U.S. PATENT DOCUMENTS

| | | | | |
|---|---|---|---|---|
| 5,899,495 A * | 5/1999 | Yamamoto et al. | ........ | 280/743.1 |
| 6,874,810 B2 * | 4/2005 | Soderquist | ................. | 280/728.3 |
| 7,481,453 B2 * | 1/2009 | Breed | ............................ | 280/738 |
| 7,744,122 B2 * | 6/2010 | Breed | ............................ | 280/731 |
| 7,766,373 B2 * | 8/2010 | Fukawatase et al. | ......... | 280/729 |
| 7,900,958 B2 * | 3/2011 | Yamauchi et al. | ............ | 280/732 |
| 8,469,393 B1 * | 6/2013 | Siewert et al. | ............. | 280/728.3 |
| 2002/0180187 A1 * | 12/2002 | Hayashi | ..................... | 280/728.3 |
| 2003/0189319 A1 * | 10/2003 | Soderquist | ................ | 280/728.3 |
| 2005/0263988 A1 * | 12/2005 | Welford | ..................... | 280/728.3 |
| 2007/0052211 A1 * | 3/2007 | Hayashi | ..................... | 280/728.3 |
| 2009/0066068 A1 * | 3/2009 | Kanno | ......................... | 280/741 |
| 2009/0194982 A1 * | 8/2009 | Yamauchi et al. | ............ | 280/732 |
| 2010/0201105 A1 * | 8/2010 | Iwazato | ..................... | 280/728.3 |
| 2013/0001937 A1 * | 1/2013 | Yamada | ........................ | 280/732 |
| 2013/0187365 A1 * | 7/2013 | Fujiwara et al. | ............ | 280/728.3 |
| 2014/0167394 A1 * | 6/2014 | Wisniewski et al. | ........ | 280/728.3 |
| 2014/0210189 A1 * | 7/2014 | Fukawatase | ................ | 280/728.3 |

FOREIGN PATENT DOCUMENTS

JP    2008007034 A    1/2008

* cited by examiner

*Primary Examiner* — Paul N Dickson
*Assistant Examiner* — Darlene P Condra
(74) *Attorney, Agent, or Firm* — Marvin A. Motsenbocker; Mots Law, PLLC

(57) ABSTRACT

An airbag includes: a gas introduction portion; and a folded bag-shaped airbag main body capable of being inflated and deployed in a first direction toward an object to be protected, by gas introduced from the gas introduction portion. The folded airbag main body includes: a deployment portion disposed to face a cover; a flow-in portion through which the gas flows from the gas introduction portion into the deployment portion; and a reduction portion disposed to face the gas introduction portion and configured to make the flow-in portion narrower toward a center portion of a main tear line of the cover and guide the gas introduced from the gas introduction portion to the center portion of the main tear line.

1 Claim, 6 Drawing Sheets

AIRBAG

CROSS REFERENCE TO RELATED APPLICATION

This application is based upon and claims the benefit of priority from the prior Japanese Patent Application No. 2013-093053, filed on Apr. 25, 2013, the entire contents of which are incorporated herein by reference.

BACKGROUND

1. Technical Field

The present invention relates to an airbag which is inflated and deployed to split a tear line of a cover and thereby form a door portion.

2. Related Art

Japanese Patent Application Publication No. 2008-7034 proposes an airbag device for an occupant in a front passenger seat which is arranged in an instrument panel of an automobile. The airbag device includes a case having an opening portion on an upper side. Inside the case, a folded airbag and an inflator configured to discharge gas for inflating the airbag are housed. A cover attached to extend along the instrument panel is attached to an upper portion of the case and covers the opening portion on the upper side. In an event of automobile collision, the airbag device inflates the airbag by discharging gas from the inflator, breaks the tear line formed in the cover with pressure of inflation of the airbag, and thereby forms an inflation opening. The airbag is inflated and deployed from the inflation opening, in front of the occupant in the front passenger seat to restrain the occupant and alleviate an impact applied to the occupant.

The tear line formed in the cover generally has, for example, an H-shape in a front view of the cover. By causing the splitting to start from a center tear traversing a center portion of the cover, portions on both sides of the center tear become door portions and turn to open. Depending on a structure around the airbag, there may occur a so-called lift-up phenomenon in which the deployed airbag comes into contact with an entire surface of the cover facing the airbag and causes the entire cover to bulge. In order to prevent the lift-up phenomenon, a protruding shape protruding toward the airbag needs to be provided on the surface of the cover facing the airbag, so that pressing force generated by the deployed airbag is intensely applied to a portion around the center tear, or the thickness of the cover needs to be reduced at the tear line. In the case of providing the protruding shape in the cover, the manufacturing cost increases and a space for housing the airbag is reduced. In the case of reducing the thickness of the cover at the tear line, bending and weakening of the cover occurs due to reduction of strength at the tear line.

SUMMARY

An object of the present invention is to provide an airbag capable of smoothly opening a door portion without making changes in a cover.

An airbag in accordance with some embodiments includes: a gas introduction portion; and a folded bag-shaped airbag main body capable of being inflated and deployed in a first direction toward an object to be protected, by gas introduced from the gas introduction portion. The folded airbag main body is covered with and housed in a cover including: a groove-shaped main tear line; groove-shaped side tear lines extending in a direction intersecting the main tear line to be continuous respectively with opposite ends of the main tear line; and a hinge portion extending between the side tear lines. Upon introduction of the gas into the airbag main body, the folded airbag main body is inflated and deployed in the first direction and splits the main tear line and the side tear lines to form a door portion in the cover and turn the door portion about the hinge portion. The folded airbag main body includes: a deployment portion disposed to face the cover; a flow-in portion through which the gas flows from the gas introduction portion into the deployment portion; and a reduction portion disposed to face the gas introduction portion and configured to make the flow-in portion narrower toward a center portion of the main tear line and guide the gas introduced from the gas introduction portion to the center portion of the main tear line.

According to the configuration described above, the flow-in portion through which the gas flows into the deployment portion is made to become narrower toward the center portion of the main tear line by the reduction portion. Accordingly, the gas is concentrated on the center portion of the main tear line in the deployment portion and the inflation pressure of the deployment portion is thus concentrated near the center portion. The main tear line can be thereby surely split first. Hence, the door portion can be smoothly opened without making changes in the cover.

The reduction portion may be a bellows fold portion formed by tucking the airbag main body at a position facing the gas introduction portion in directions toward opposite ends of the main tear line in a second direction intersecting the first direction.

According to the configuration described above, the bellows fold portion formed by tucking the airbag main body at the positions facing the gas introduction portion of the airbag main body in the directions toward opposite ends of the main tear line in the direction intersecting a predetermined direction is used as the reduction portion. Accordingly, the reduction portion can be easily formed by tucking the airbag main body.

The bellows fold portion may include a plurality of tucked portions tucked in the directions toward opposite ends of the main tear line in the second direction. A tucking of any of the plurality of tucked portions may extend closer to the center portion of the main tear line than the other tucked portions extend.

According to the configuration described above, the tucking of any of the plurality of tucked portions set in each of the bellows fold portions is set to be deeper than the tucking of the other tucked portions. Accordingly, a gas passage from the gas introduction portion to the flow-in portion can be easily and surely made smaller in the direction along the main tear line.

DETAILED DESCRIPTION

An airbag of an embodiment of the present invention is described below with reference to the drawings.

Figure 1A:
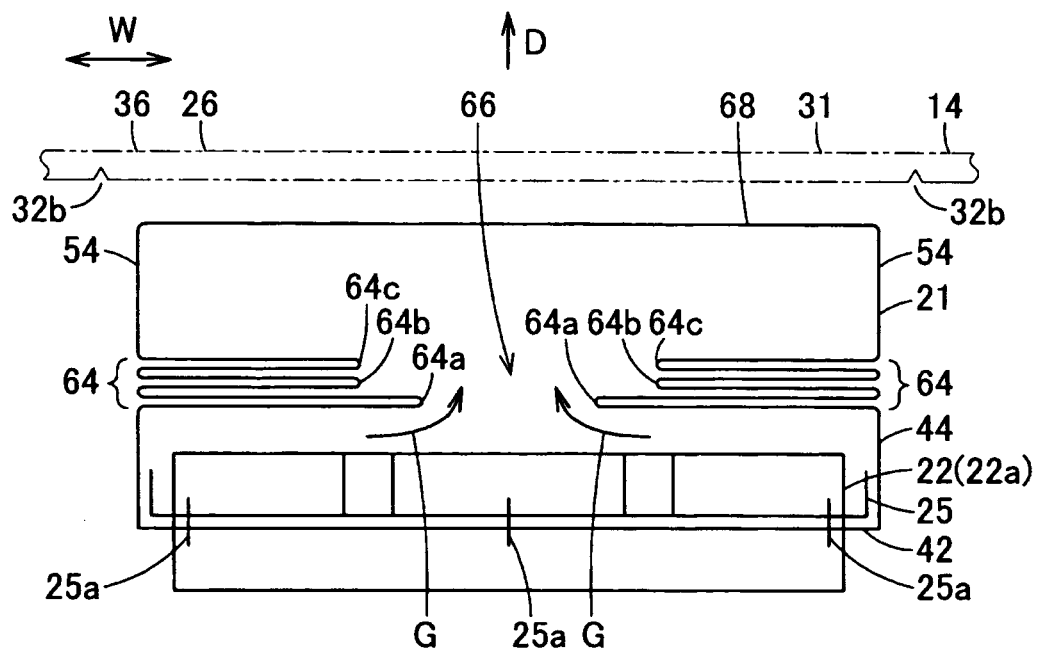
FIG. 1A is a front face view schematically showing an airbag in an embodiment.
Figure 2A:
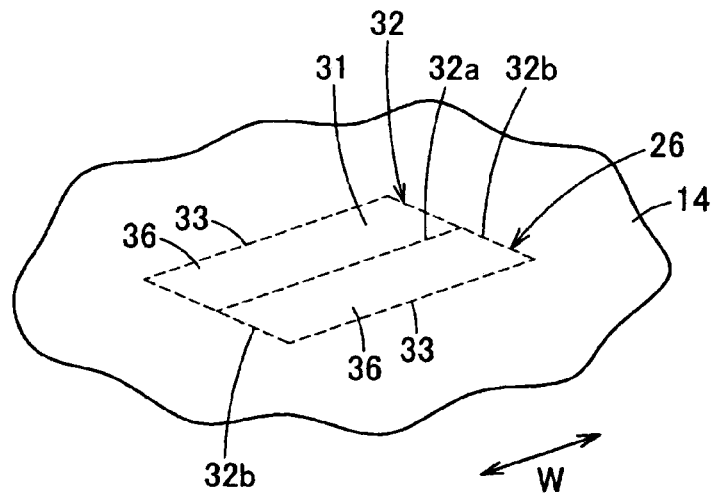
FIGS. 2A to 2C are perspective views showing, in sequence, a splitting operation of the cover due to deployment of an airbag main body of the airbag in the embodiment.
Figure 2B:
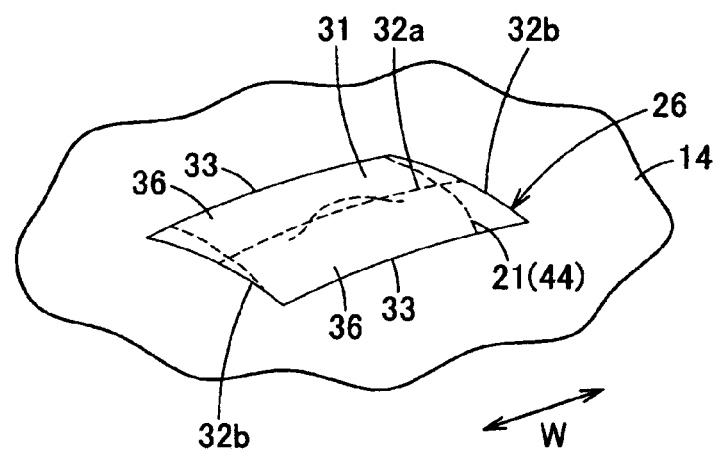
Figure 2C:
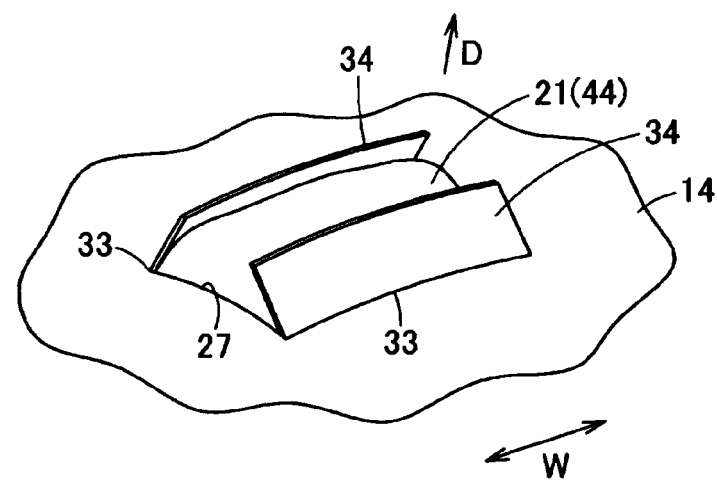
Figure 3:
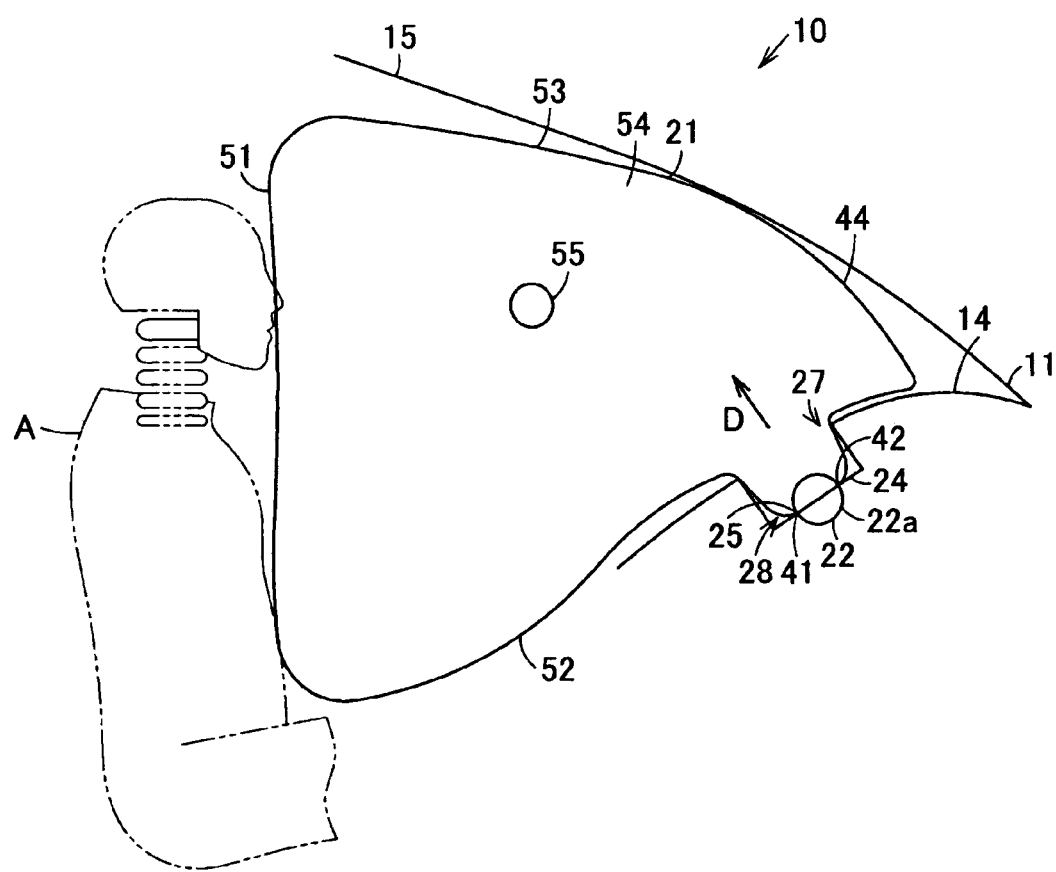
FIG. 3 is a side view schematically showing a deployed state of the airbag main body in the embodiment.

An airbag device 10 in the embodiment which is shown in FIGS. 1A to 4E is arranged inside an instrument panel 14, which is an installed portion, in front of an occupant A, which is an object to be protected, in a front passenger seat of an automobile 11, which is a vehicle being a moving body, and functions as an airbag device for the occupant in the front passenger seat. Note that a front-rear direction, both lateral directions, and an up-down direction are described below based on a travelling direction of the automobile 11 with the airbag device 10 attached to the automobile 11. In FIG. 3, the passenger A is illustrated as a dummy.

The instrument panel 14 is formed of, for example, members made of synthetic resin and the like, in a curved shape which becomes slightly lower toward the rear, i.e. the front passenger seat. The airbag device 10 is fixed by screws or the like to a not-illustrated steering member which is an attached member arranged inside the instrument panel 14, with a front face of the airbag device 10 being slightly inclined to the rear side, i.e. the occupant A side, from a posture facing upward. A front glass 15 which is a windshield inclined to extend from a lower front side to an upper rear side is arranged above the instrument panel 14.

The airbag device 10 is also called airbag module. The airbag device 10 includes an airbag 21 made of base cloth, an inflator 22 configured to supply gas to the airbag 21, a case 24 to which the airbag 21, the inflator 22, and the like are attached, a retainer plate 25, a cover 26 covering the airbag 21 before deployment, a not-illustrated control unit configured to control operations of the inflator 22, and the like.

The case 24 is formed in a substantially-box shape. The case 24 has a rectangular project-out opening 27, which is an opening portion, on the front face side or the upper side facing the front glass 15, and has therein an airbag housing portion 28 housing the folded airbag 21. The project-out opening 27 is covered with the cover 26 in normal times.

The inflator 22 has a main body 22a formed in a columnar (cylindrical) shape. The main body 22a is fixed by being interposed between and held by a bottom portion of the case 24 and the retainer plate 25. Although not illustrated, an igniter and an agent are housed inside the main body 22a. The igniter causes the agent to combust in response to an electric signal from the control unit which is transmitted via a connector connected to a bottom portion, and the gas for inflation is thus rapidly supplied from a gas nozzle provided in an outer periphery. Note that the inflator 22 comes in various shapes and, for example, single or multiple inflators 22 each having a disc-shaped main body may be used.

The retainer plate 25 is also called mid-retainer or the like. The retainer plate 25 has a quadrilateral frame shape elongated in a vehicle width direction W intersecting (orthogonal to) a predetermined direction D. Multiple attachment bolts 25a are provided to protrude from the retainer plate 25. The retainer plate 25 holds and fixes the main body 22a of the inflator 22 via a not-illustrated lower retainer plate and the like.

The cover 26 is also called airbag door panel, airbag lid, or the like. The cover 26 is made of resin and is formed integrally with or separately from the instrument panel 14. The cover 26 includes a cover main body 31 which faces the airbag 21, a tear line 32 which defines the cover main body 31 and which is made thinner than other portions to easily break, and hinge portions 33. Note that, in the following description, the cover 26 is formed in a plate shape by using a single piece of synthetic resin, for the sake of convenience. However, for example, the cover 26 may be formed by stacking multiple plate-shaped pieces of synthetic resin one on top of another and welding them together.

The cover main body 31 is formed, for example, in a quadrilateral shape elongated in the vehicle width direction. The cover main body 31 forms quadrilateral door portions 34, 34 which are airbag bulging doors being door flaps opened by being broken by inflation of the airbag 21.

The tear line 32 is also called expected line portion, breakage expected portion, or the like. The tear line 32 includes: a center tear 32a which is a center tear line being a main tear line extending in the vehicle width direction in an elongated manner; and side tears 32b, 32b which are side tear lines extending in the front-rear direction intersecting (orthogonal to) the center tear 32a to be continuous respectively with opposite ends of the center tear 32a, and has a substantially-H shape. The tear line 32 is formed in a groove shape on a back face side of the cover main body 31.

The hinge portions 33, 33 are thin portions formed to extend between end portions of the side tears 32b, 32b in the vehicle width direction and allow opening of the door portions 34, 34. In other words, the door portions 34, 34 open by turning about the hinge portions 33, 33. The center tear 32a, the side tears 32b, 32b, and the hinge portions 33 thus define, for example, quadrilateral door expected portions 36, 36 which cover the project-out opening 27 and which open the project-out opening 27 by opening and becoming the door portions 34.

The airbag 21 is formed of a single sheet of base cloth or by combining multiple sheets of base cloth. The airbag 21 includes a bag-shaped airbag main body 44 which is an outer shell portion. The airbag main body 44 is configured such that the width dimension thereof is substantially constant while the thickness dimension thereof increases in a direction from a based end portion, which is one end portion, to a distal end portion, which is the other end portion, the base end portion located near an attachment portion 42 which is a mount portion including a gas introduction portion 41 being an inflator attachment port. The airbag main body 44 is formed continuously of a front face portion 51 which is a restraining surface facing the occupant A in, for example, deployment, a lower face portion 52 which faces the instrument panel 14, a upper face portion 53 which faces the front glass 15, and side face portions 54, 54 which are located on both sides of the front face portion 51, the lower face portion 52, and the upper face portion 53. Specifically, in the airbag main body 44, the lower face portion 52 and the upper face portion 53 are continuous with each other in the base end portion, the lower face portion 52 is continuous with a lower edge of the front face portion 51, and the upper face portion 53 is continuous with an upper edge of the front face portion 51. In addition, the side face portions 54, 54 are continuous with both sides of the front face portion 51, the lower face portion 52, and the upper face portion 53. A circular-hole-shaped exhaust port 55 also called vent hole is formed in each of the side face portions 54.

The gas introduction portion 41 is, for example, a rectangular hole portion corresponding to the shape of the inflator 22.

The attachment portion 42 is a portion fixed to the case 24 via the retainer plate 25. The attachment portion 42 has the gas introduction portion 41 in a center portion and is formed in a quadrilateral shape elongated in the vehicle width direction W. Moreover, multiple attachment holes 57 into which the attachment bolts 25a are inserted are formed around the gas introduction portion 41 of the attachment portion 42.

The airbag 21 is folded in a predetermined shape to be described later and is housed inside the airbag housing portion 28 in the case 24 with the attachment portion 42 around the gas introduction portion 41 being held by the retainer plate 25 and being pressed against the bottom portion of the case 24. The inflator 22 is interposed between and held by the retainer plate 25 and the lower retainer plate, and not-illustrated nuts are screwed and fastened to the attachment bolts 25a inserted through attachment holes provided in the lower retainer plate. In this state, the airbag 21, the case 24, and the inflator 22 are fastened together and fixed between the retainer plate 25 and a set of the lower retainer plate and not-illustrated nuts.

In the airbag device 10 configured as described above, the control unit activates the inflator 22 in the case of automobile collision and the like and the gas is discharged from the inflator 22. Then, the airbag 21 is inflated and deployed with flow-in of the gas, breaks the tear line 32 of the cover 26, and projects out from the project-out opening 27 to the front face side in a predetermined direction D (the direction toward the occupant A) which is a rear direction. The airbag 21 is then further inflated and deployed in an action to be described later and spreads out in front of the occupant A seated in the front passenger seat to protect the occupant A from impact of collision.

Next, a folded shape and folding steps of the airbag 21 are described.

Figure 4A:
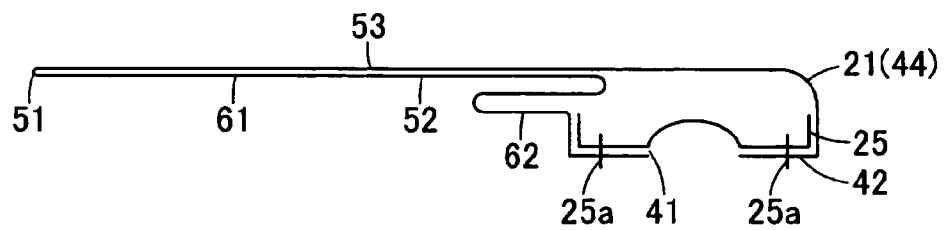
FIG. 4A is a vertical side cross-sectional view schematically showing a state where the airbag main body in the embodiment is folded in a planar shape.

First, the retainer plate 25 is inserted inside the airbag main body 44 of the airbag 21, the attachment bolts 25a are pulled out to the outside of the main body 44, and the airbag main body 44 is set to a deployed state. From this state, as shown in FIG. 4A, the airbag main body 44 is folded in a planar shape (in a flat shape) in a thickness direction by causing the upper face portion 53 and the lower face portion 52 to vertically overlap each other, and a folded portion 61 is thus formed. In addition, a base end side of the folded portion 61 is folded in the front-rear direction and an adjustment folded portion 62 is thus formed. Specifically, the airbag main body 44 is folded in the planar shape to extend from one end side to the other end side (in an opposite direction to the predetermined direction D) with the gas introduction portion 41 (the attachment portion 42 and the retainer plate 25) side, which is the side to be mounted on the automobile 11, being located on the occupant A (FIG. 3) side, which is the one end side. Note that the adjustment folded portion 62 is provided for adjustment made to prevent wrinkles and skews in the folded portion 61. In a case where the folded portion 61 can be formed without wrinkles and skews due to the shape of the airbag main body 44 and the like, there is no need to provide the adjustment folded portion 62.

Figure 4B:
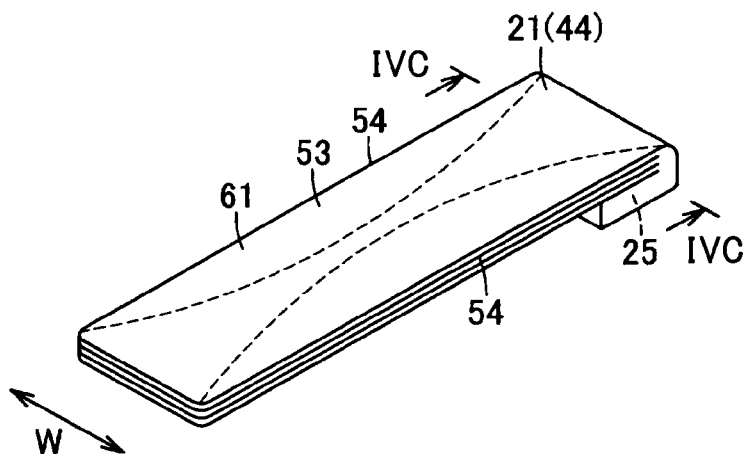
FIG. 4B is a perspective view of the airbag main body of FIG. 4A in which bellows fold portions are formed on both sides.

Next, as shown in FIG. 4B, folding lines are formed in the side face portions 54, 54 and the folded portion 61 is tucked in a bellows shape in the vehicle width direction toward the center side (the inside of the airbag main body 44), in such a way that the width of the folded portion 61 becomes substantially equal to a predetermined width, for example the width dimension of the attachment portion 42 (the retainer plate 25).

Figure 4C:
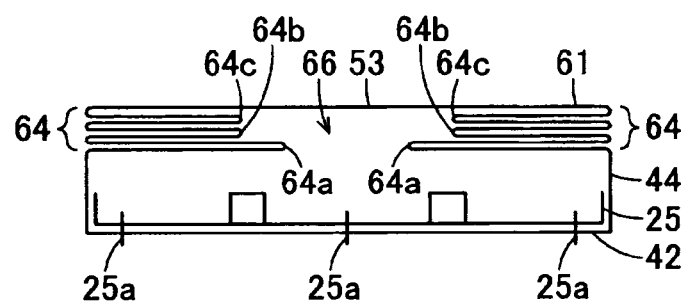
FIG. 4C is a cross-sectional view taken along the IVC-IVC line of FIG. 4B.

As shown in FIG. 4C, bellows fold portions 64, which are reduction portions, are thus formed on both sides of the folded portion 61.

In each of the bellows fold portions 64, multiple, for example three in the embodiment, tucked portions of first to third tucked portions 64a, 64b, 64c which may be called first to third tucked valleys are sequentially formed from the gas introduction portion 41 side to the opposite side to the gas introduction portion 41. The first tucked portion 64a is closest to the gas introduction portion 41, i.e. is at a lowest position, and directly faces the gas introduction portion 41. The second tucked portion 64b and the third tucked portion 64c are sequentially stacked on the first tucked portion 64a. Moreover, tucking of the first tucked portion 64a is set to be deeper than the second and third tucked portions 64b, 64c. In other words, a protruding amount of the first tucked portion 64a to the inside of the airbag main body 44 is set to be larger than those of the other tucked portions 64b, 64c. A narrowed flow-in portion 66 is thus formed by the bellows fold portions 64 in a center portion of the airbag main body 44 in a direction along the center tear 32a of the tear line 32, i.e. the vehicle width direction W, to face the gas introduction portion 41.

The folded shapes of the bellows fold portions 64, particularly, the first tucked portions 64a vary depending on the shapes of the side face portions 54. For example, in the embodiment, each bellows fold portion 64a is formed such that the tucking thereof gradually becomes deeper from the base end side (the side of the retainer plate 25 and the gas introduction portion 41) and the distal end side of the airbag main body 44 toward an intermediate portion (center portion) between the base end side and the distal end side (FIGS. 4B and 4C). Accordingly, the flow-in portion 66 facing the gas introduction portion 41 is formed in a substantially-V-shape which gradually becomes wider from one side to another side (Note that a shape in which two edges on both sides are open is also included) (FIG. 1C).

Note that four or more tucked portions or two or less tucked portions may be formed in each of bellows fold portions 64 depending on the shapes of the side face portions 54 or a required depth of the tucking. When the number of the tucked portions is increased with the shapes of the side face portions 54 being the same, the depth of tucking becomes relatively smaller and restriction of a gas passage from the gas introduction portion 41 to the flow-in portion 66 is suppressed. Meanwhile, when the number of the tucked portions is decreased with the shapes of the side face portions 54 being the same, the depth of tucking becomes relatively larger and the restriction of the gas passage from the gas introduction portion 41 to the flow-in portion 66 increases.

Figure 4D:
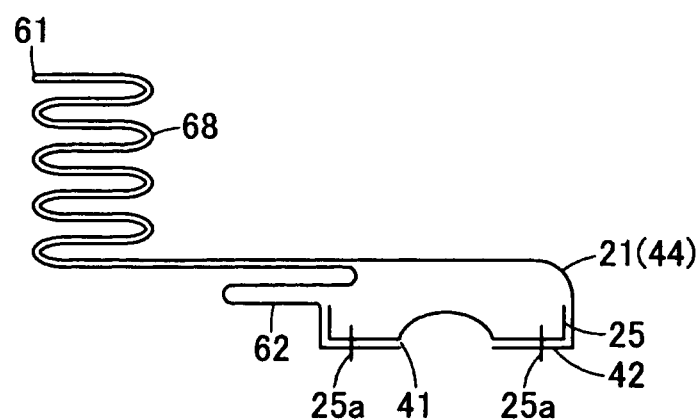
FIGS. 4D and 4E are vertical side cross-sectional views schematically showing, in sequence, steps of folding the airbag main body of the airbag in FIG. 4A.

Next, as shown in FIG. 4D, in the distal end portion of the folded portion 61, multiple folding lines extending along the vehicle width direction W are formed at equal intervals parallel to each other and the folded portion 61 is folded alternately in opposite directions. A bellows-shaped converged portion 68 which is a deployment portion is thus formed.

Figure 4E:
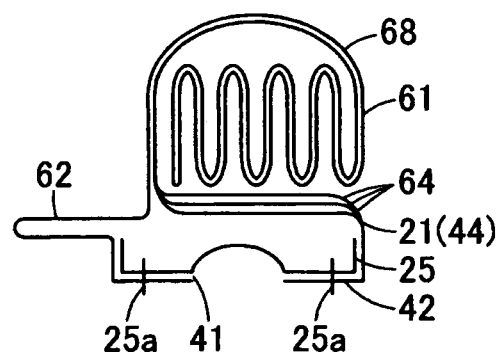

Then, as shown in FIG. 4E, the converged portion 68 is rolled toward the base end portion of the folded portion 61 in a roll shape to fall and turn at a predetermined angle, for example, 180°, and is stacked on an upper portion of a base end portion of the folded portion 61. The converged portion 68 is thus arranged above the gas introduction portion 41 with the bellows fold portions 64 therebetween at a position facing the flow-in portion 66.

Figure 1B:
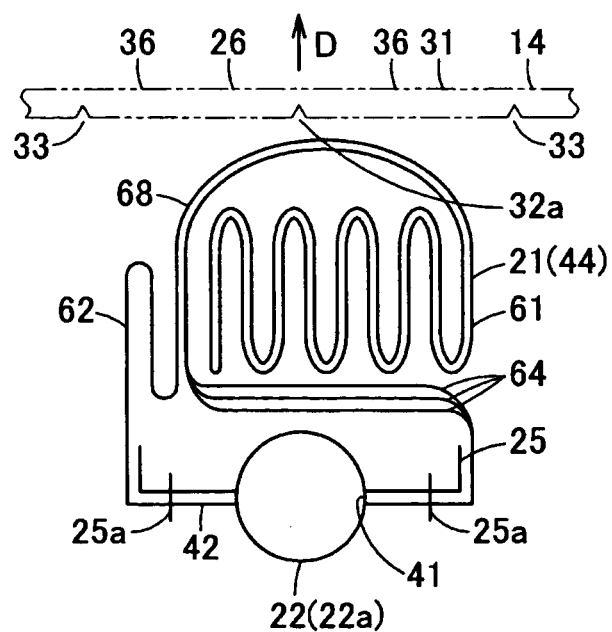
FIG. 1B is a side view schematically showing the airbag in the embodiment.
Figure 1C:
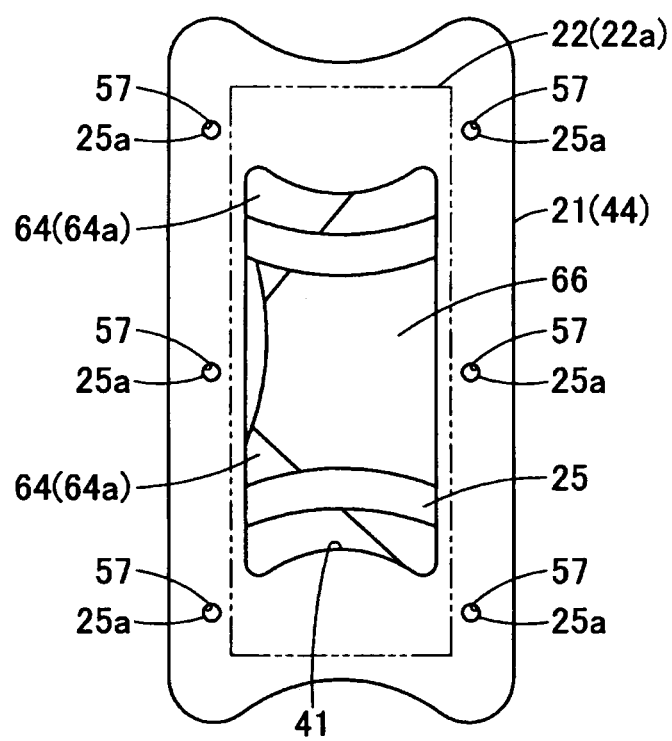
FIG. 1C is a plan view schematically showing the airbag in the embodiment from below.

Thereafter, the adjustment folded portion 62 is made to overlap a side portion of the converged portion 68 (see FIG. 1B).

The shape of the airbag 21 folded as described above is maintained by appropriate means such as a breakable wrapping member and the airbag 21 is housed in the case 24. Then the airbag 21 is attached to the instrument panel 14 in a state covered with the cover 26. In this state, the flow-in portion 66 is arranged to become wider from the front side, which is the opposite side to the occupant A (the front glass 15 side), toward the rear side, which the occupant A side.

Next, a deployment operation of the airbag 21 is described.

When the gas is supplied from the inflator 22 to the airbag 21 housed in a folded state through the gas introduction portion 41 in the state shown in FIGS. 1A to 1C, the gas is introduced into the airbag 21 from the gas introduction portion 41. At this time, the gas comes into contact with the bellows fold portions 64 (the first tucked portions 64a) and direct entrance of the gas into the converged portion 68 is restricted. At the same time, the gas is guided to the center portion (the center portion of the center tear 32a) of the airbag main body 44 in the vehicle width direction W along the bellows fold portions 64 (the first tucked portions 64a) and flows into the converged portion 68 from the flow-in portion 66. The gas thereby pushes the center portion in the vehicle width direction W upward more than both side portions thereof. Accordingly, stress concentrates in a center portion, in the vehicle width direction W, of the center tear 32a of the tear line 32 of the cover main body 31 which faces the center portion of the airbag main body 44 (FIG. 2B) and the center portion of the center tear 32a is thus pushed upward. A center portion of the cover main body 31 thereby bulges in a mountain shape and the cover main body 31 is first split along the center tear 32a. After the splitting of the cover main body 31, the side tears 32b, 32b are subsequently split and the entire tear line 32 is split, thereby forming the door portions 34, 34. The door portions 34, 34 turn about the hinge portions 33, 33 to open and the project-out opening 27 is thereby opened (FIG. 2C). Then, in the converged portion 68, the roll-shape is unrolled while the bellows shape is unfolded. As shown in FIG. 3, the airbag 21 is thus deployed toward the occupant A in the predetermined direction D (rearward) and forms the front face portion 51, the lower face portion 52, and the upper face portion 53. Meanwhile, the bellows fold portions 64 on both sides are deployed to form the side face portions 54, 54 on both sides in the vehicle width direction W. The entire airbag 21 is thus deployed.

In the embodiment, the flow-in portion 66 through which the gas flows into the converged portion 68 is made to become narrower toward the center portion of the center tear 32a by the bellows fold portions 64. Accordingly, the gas is concentrated on the center portion of the center tear 32a and inflation pressure of the converged portion 68 is concentrated near the center portion. The center tear 32a can be thereby surely split first. Hence, the door portions 34 can be smoothly opened without making changes in the cover 26 such as providing a protrusion shape protruding toward the airbag 21 in the cover 26 and further reducing the thickness of the cover 26 at the center tear 32a.

Moreover, there is no occurrence of a so-called lift-up phenomenon in which the deployed airbag 21 comes into contact with the entire cover main body 31 of the cover 26 and cause the entire cover main body 31 to bulge. Accordingly, it is possible to stabilize the opening of the door portions 34 and internal pressure of the inflated and deployed airbag 21 and to also reduce reinforcement of the airbag 21. Furthermore, it is possible to prevent increase in cost due to design change in the cover 26 and weakening of the cover 26 due to reduction of the thickness of the cover 26 and the production cost can be reduced.

Particularly, in a so-called seamless instrument panel in which, for example, the cover main body 31 of the cover 26 and the instrument panel 14 are integrally formed, the cover 26 is molded by using a relatively hard material (synthetic resin) to prevent deformation over time and splitting of the tear line 32 is thus more difficult. The airbag 21 can be easily applied even to the seamless instrument panel by causing splitting to surely occur at the position of the center tear 32a as described above.

Moreover, in the embodiment, the flow-in portion 66 is made to become narrower toward the center portion of the center tear 32a by the bellows fold portions 64 formed by tucking the airbag main body 44 at positions facing the gas introduction portion 41 of the airbag main body 44, in directions toward opposite ends of the center tear 32a, in the vehicle width direction W intersecting the predetermined direction W. Accordingly, the flow-in portion 66 can be easily formed by simply tucking the airbag main body 44 and step of forming the aforementioned bellows fold portions 64 can be easily incorporated in steps of folding the airbag main body 44. Moreover, since matters can be handled only by tucking the airbag main body 44, the aforementioned airbag 21 can be easily applied to the existing airbag device 10 without making any design change.

Furthermore, the tucking of one of the multiple tucked portions 64a, 64b, 64c, the first tucked portion 64a in the embodiment, set in each of the bellows fold portions 64 is set to be deeper than the tucking of the other tucked portions 64b, 64c. Accordingly, it is possible to surely make the flow-in portion 66 narrower toward the center portion of the center tear 32a and easily and surely make the gas passage from the gas introduction portion 41 to the flow-in portion 66 smaller in the direction along the center tear 32a. In addition, since the first tucked portion 64a is closest to the gas introduction portion 41 among the first to third tucked portions 64a, 64b, 64c, the gas passage from the gas introduction portion 41 to the flow-in portion 66 can be more easily and surely made smaller.

In the aforementioned embodiment, the flow-in portion 66 may be formed in, for example, a parallel linear shape instead of the substantially-V shape which becomes wider from the one side toward the other side.

Moreover, the main tear line 32a may be formed to be located at a position on a side portion of a single door portion 34 instead of the position between the door portions 34, 34 (the door expected portions 36, 36). In this case, operations and effects similar to the aforementioned embodiment can be obtained by forming the hinge portion 33 extending between the side tear lines 32b, 32b, in the opposite side portion of the door portion 34.

Furthermore, the tucking of, for example, the second tucked portion 64b or the third tucked portion 64c out of the multiple first to third tucked portions 64a, 64b, 64c set in each bellows fold portion 64 may be set to be the deepest. In other words, the tucking of a tucked portion other than the tucked portion closest to the gas introduction portion 41 may be set to be deeper than the other tucked portions.

Moreover, the flow-in portion 66 may have a left-right asymmetrical shape.

Although the embodiments of the present invention has been described above, the invention is not limited to the above embodiment, and various modifications are possible.

The invention claimed is:

1. An airbag comprising:
   a gas introduction portion; and a folded bag-shaped airbag main body capable of being inflated and deployed in a first direction toward an object to be protected, by gas introduced from the gas introduction portion, wherein the folded airbag main body is covered with and housed in a cover including: a groove-shaped main tear line; groove-shaped side tear lines extending in a direction intersecting the main tear line to be continuous respectively with opposite ends of the main tear line; and a hinge portion extending between the side tear lines, upon introduction of the gas into the airbag main body, the folded airbag main body is inflated and deployed in the first direction and splits the main tear line and the side tear lines to form a door portion in the cover and turn the door portion about the hinge portion, and the folded airbag main body comprises:
  a deployment portion disposed to face the cover;
  a flow-in portion through which the gas flows from the gas introduction portion into the deployment portion; and
  a reduction portion disposed to face the gas introduction portion and configured to make the flow-in portion narrower toward a center portion of the main tear line and guide the gas introduced from the gas introduction portion to the center portion of the main tear line, wherein the reduction portion is a bellows fold portion formed by tucking the airbag main body at a position facing the gas introduction portion in directions toward opposite ends of the main tear line in a second direction intersecting the first direction, the bellows fold portion includes a plurality of tucked portions tucked in the directions toward opposite ends of the main tear line in the second direction, and a tucking of a tucked portion of the plurality of tucked portions which is most adjacent to the gas introduction portion among the plurality of tucked portions extends closer to the center portion of the main tear line than tuckings of the other tucked portions extend.

* * * * *